(12) United States Patent
Sugie

(10) Patent No.: US 9,485,434 B2
(45) Date of Patent: Nov. 1, 2016

(54) IMAGE CAPTURING APPARATUS, CONTROL METHOD, AND PROGRAM THEREOF

(71) Applicant: CANON KABUSHIKI KAISHA, Tokyo (JP)

(72) Inventor: Kazuhiko Sugie, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/327,407

(22) Filed: Jul. 9, 2014

(65) Prior Publication Data
US 2015/0015774 A1 Jan. 15, 2015

(30) Foreign Application Priority Data
Jul. 11, 2013 (JP) ................. 2013-145800

(51) Int. Cl.
H04N 5/235 (2006.01)
H04N 5/335 (2011.01)
G03B 7/00 (2014.01)
H04N 5/232 (2006.01)
H04N 5/355 (2011.01)

(52) U.S. Cl.
CPC ........ *H04N 5/2353* (2013.01); *H04N 5/23245* (2013.01); *G03B 7/00* (2013.01); *G06T 2207/20208* (2013.01); *H04N 5/2351* (2013.01); *H04N 5/2355* (2013.01); *H04N 5/35536* (2013.01)

(58) Field of Classification Search
None
See application file for complete search history.

(56) References Cited

U.S. PATENT DOCUMENTS

| 2002/0071044 | A1 | 6/2002 | Takahashi | |
|---|---|---|---|---|
| 2002/0145674 | A1* | 10/2002 | Nakamura | H04N 5/235 348/296 |
| 2009/0251563 | A1* | 10/2009 | Mochida | G03B 7/08 348/229.1 |
| 2010/0097493 | A1* | 4/2010 | Asoma | H04N 5/235 348/229.1 |

* cited by examiner

*Primary Examiner* — Timothy J Henn
*Assistant Examiner* — Quan Pham
(74) *Attorney, Agent, or Firm* — Canon USA, Inc. IP Division

(57) ABSTRACT

An image capturing apparatus includes an image capturing unit which captures an image of an object and outputs an image, a switching unit which switches modes between a first mode in which the image capturing unit outputs a first image and then outputs a second image having an exposure value different from the first image, and a second mode in which the image capturing unit continuously outputs an image not used for compositing, an exposure control unit which controls an exposure value for capturing an image of an object, following change in object luminance, when a parameter related to change in object luminance exceeds a predetermined range in which an exposure value for capturing an image of the object is not controlled to follow the change in object luminance, and a setting unit which sets the predetermined range.

17 Claims, 10 Drawing Sheets

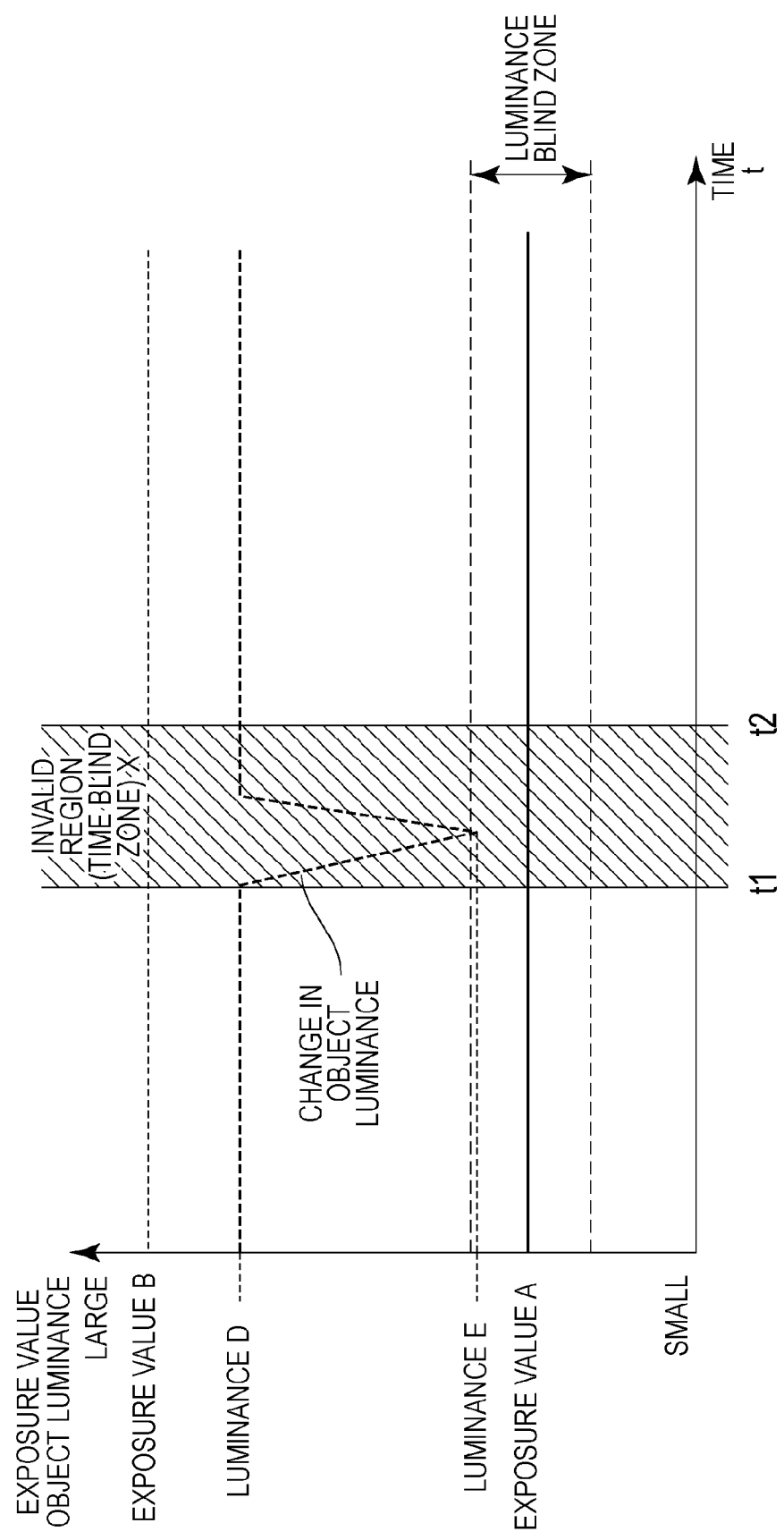

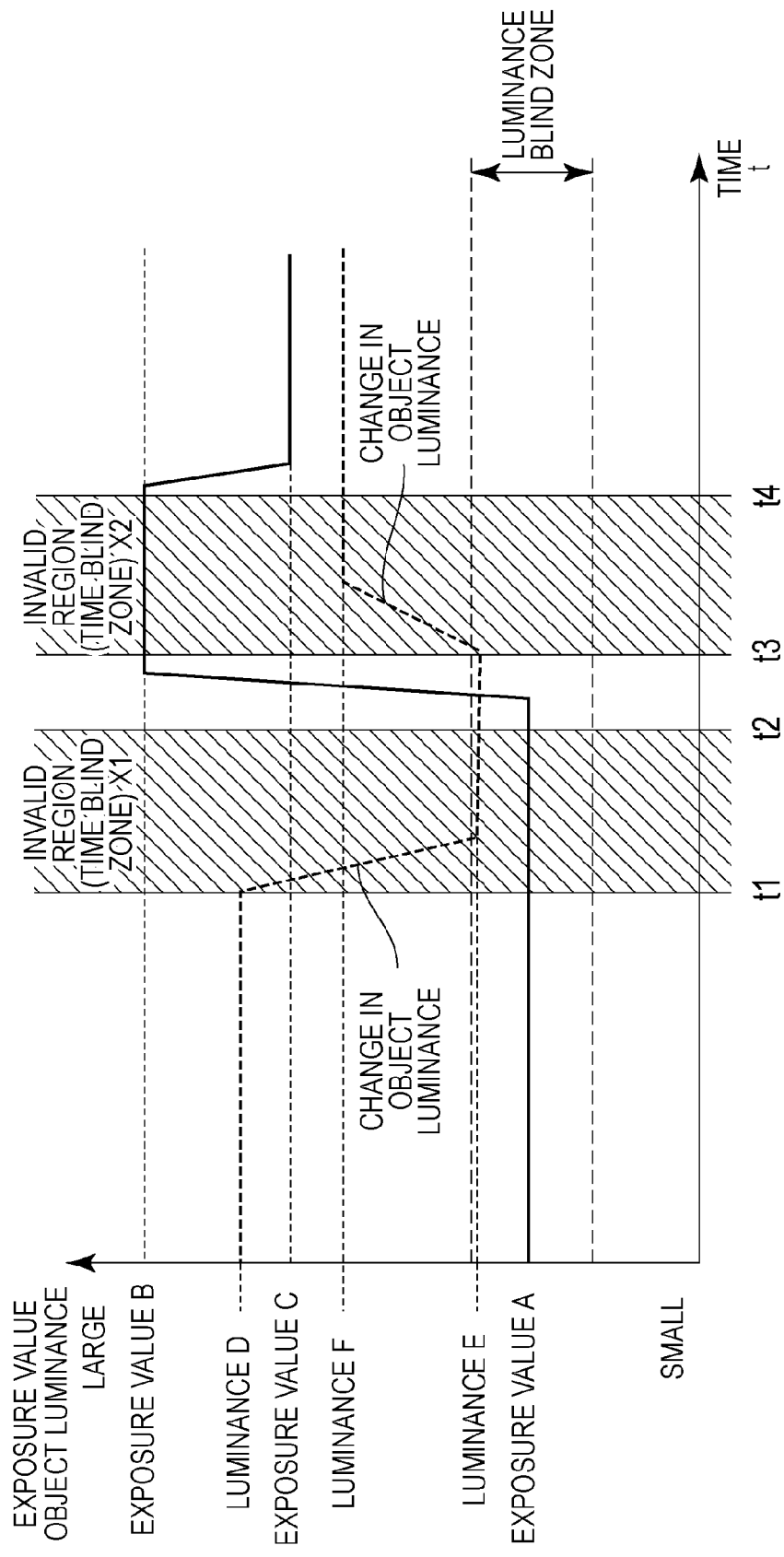

IMAGE CAPTURING APPARATUS, CONTROL METHOD, AND PROGRAM THEREOF

BACKGROUND OF THE INVENTION

Field of the Invention

The present disclosure generally relates to imaging and, more particularly, to an image capturing apparatus which acquires a plurality of images having different exposure values, a control method for the image capturing apparatus, and a program of the control method.

Description of the Related Art

Conventionally, in the field of an image capturing apparatus, a technique called a HDR (High Dynamic Range) composite processing in which a plurality of images having different exposure values is acquired in a same scene and the plurality of the images is composited is generally known as a technique to extend the dynamic range.

In the HDR composite processing, at first, an image having an exposure value (proper exposure value) according to the photometric result of an object is acquired. Further, either of or both of the image captured with an under exposure value in which the exposure value is relatively smaller than the proper exposure value and the image captured with an over exposure value in which the exposure value is relatively larger than the proper exposure value is acquired. Then, by compositing the acquired images having different exposure values, an image having a wide dynamic range can be acquired.

In U.S. Patent Application Publication No. 2002/0071044 A1, an image capturing apparatus which can periodically acquire (capture) images having different exposure values, composite each image inside the image capturing apparatus, and continuously output the image is proposed as a so-called HDR video technology applying the above-mentioned configuration to a video.

SUMMARY OF THE INVENTION

According to an aspect of the disclosure, an image capturing apparatus includes an image capturing unit configured to capture an image of an object and to output an image, a switching unit configured to switch modes between a first mode in which the image capturing unit outputs a first image and then outputs a second image having an exposure value different from the first image and a second mode in which the image capturing unit continuously outputs an image not used for compositing, an exposure control unit configured to control an exposure value for capturing an image of an object, following change in the object luminance, when a parameter related to change in object luminance exceeds a predetermined range, and a setting unit configured to set the predetermined range. The image capturing apparatus is characterized in that the first image and the second image are used for compositing, the predetermined range is a range in which an exposure value is not controlled to follow the change in the object luminance for capturing an image of the object, the setting unit sets a first range as the predetermined range in the first mode, and the setting unit sets a second range which is narrower than the first range as the predetermined range in the second mode.

According to the disclosure, when a plurality of images having different exposure values is acquired, the increase in the frequency of carrying out exposure control according to the change in the object luminance can be suppressed.

Further features of the disclosure will become apparent from the following description of exemplary embodiments (with reference to the attached drawings).

BRIEF DESCRIPTION OF THE DRAWINGS

FIGS. 7A and 7B are figures exemplarily explaining the change in object luminance and an exposure value at a predetermined time in the digital camera 100 which is a second exemplary embodiment of the image capturing apparatus practicing the present disclosure.

DESCRIPTION OF THE EMBODIMENTS

First Exemplary Embodiment

Figure 1:
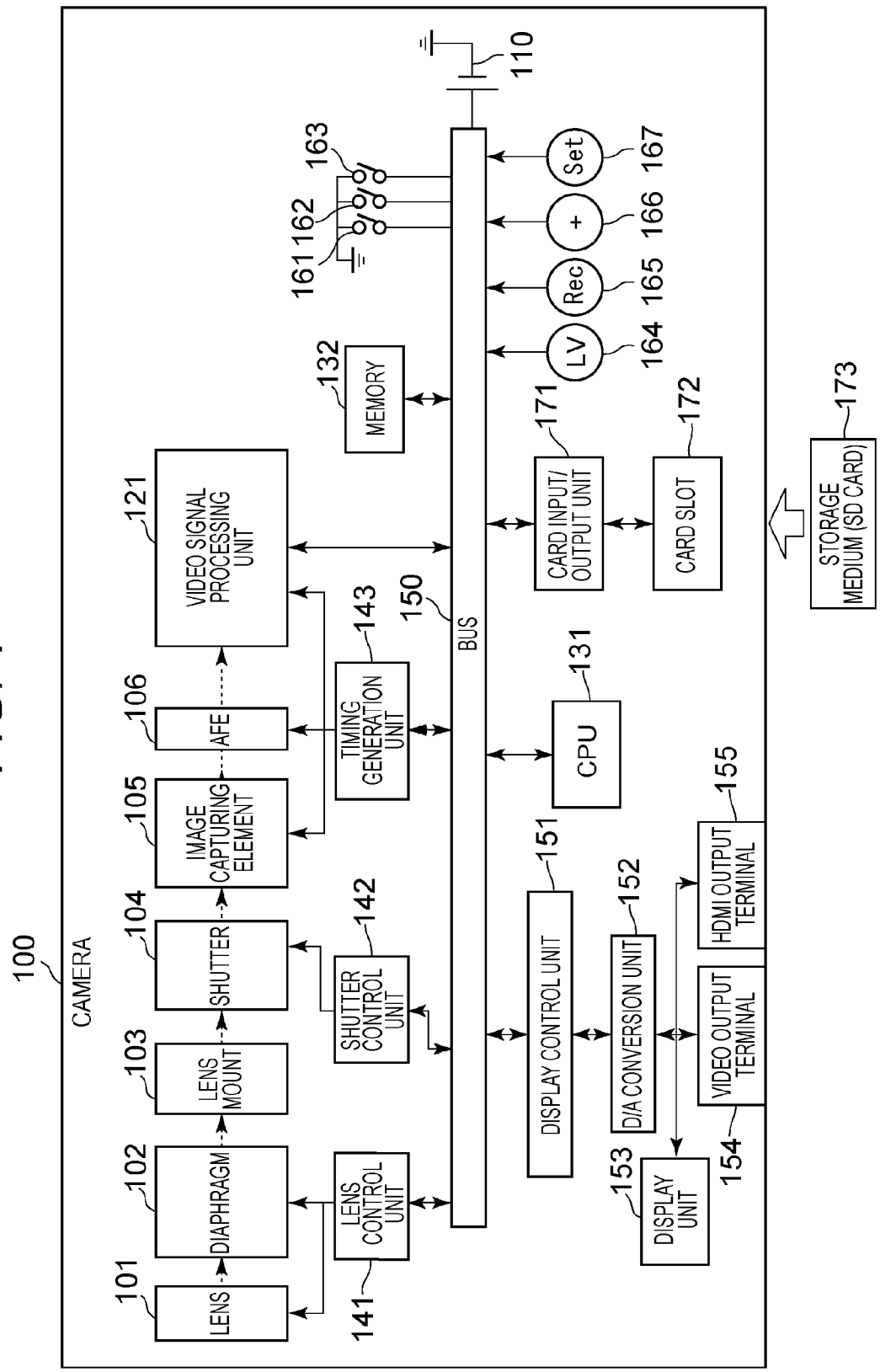
FIG. 1 is a block diagram illustrating an exemplary configuration of a digital camera 100 which is an image capturing apparatus according to a first exemplary embodiment practicing the present disclosure.
Figure 2:
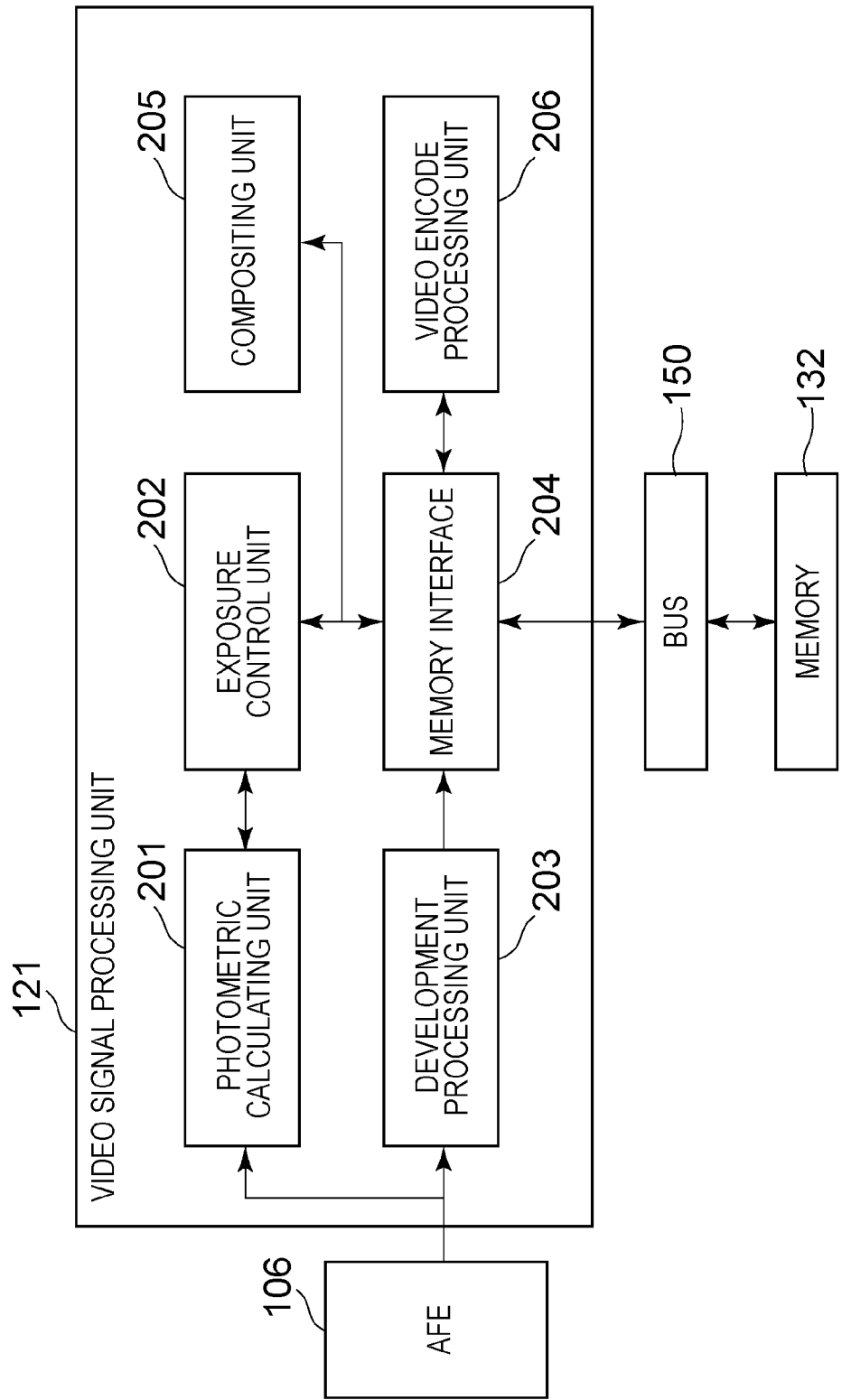
FIG. 2 is a block diagram illustrating an exemplary configuration of a video signal processing unit 121 of the digital camera 100 which is the image capturing apparatus according to the first exemplary embodiment practicing the present disclosure.

An embodiment according to the present disclosure will be described below referring to FIG. 1 and FIG. 2. FIG. 1 is a block diagram illustrating an exemplary configuration of a digital camera 100 which is an image capturing apparatus according to a first exemplary embodiment practicing the present disclosure. The basic configuration of the digital camera (hereinafter referred to as simply a camera) 100 will be described below referring to FIG. 1.

A lens 101 is a group of lenses which introduces an optical image of the object to an image capturing element 105 which will be described below. The lens 101 is a group of lenses composed of a plurality of lenses including a focus lens, zoom lens, and a shift lens.

A diaphragm 102 is a light amount adjustment member for adjusting the amount of light which makes incidence on the inside of the camera 100 (particularly the image capturing element 105) via the lens 101.

A lens control unit 141 is a drive control unit which controls the driving of the lens 101 and the diaphragm 102 according to a command from a CPU (light amount adjusting unit) 131 which will be described below. By driving the lens 101 by the lens control unit 141, zooming operation and focusing operation against the object can be controlled. Further, by the lens control unit 141 controlling the driving of the diaphragm 102, the amount of light making incidence on the image capturing element 105 can be adjusted. Note that, in the exemplary embodiment, the description is made for the case in which the light amount adjustment member is the diaphragm 102. However, it may be configured to include an ND filter as a light amount adjustment member. In this case, the lens control unit 141 controls the driving and operation of the ND filter. As used herein, the term "unit" generally refers to any combination of software, firmware, hardware, or other component that is used to effectuate a purpose.

A lens mount 103 is a connection unit for connecting the lens 101 to the main body of the camera 100. The camera 100 of the exemplary embodiment is so-called a lens interchangeable digital camera in which the lens 101 can be attached to and detached from the camera main body. Note that, it goes without saying that the camera 100 may be a digital camera to which the lens 101 and the camera main body are integrally provided.

A shutter 104 is a light-shielding member of which driving is controlled by a shutter control unit 142 so as to suitably switch the state of the image capturing element 105 from the exposure state to the light-shielding state and vice versa.

The image capturing element 105 is an image capturing unit configured with a charge accumulation type image sensor such as a CCD or a CMOS. When an optical image of the object, introduced by the lens 101, is formed on the image capturing element 105, the image capturing element 105 outputs an analog image data corresponding to the optical image. Note that, the image capturing element 105 can adjust the accumulation time by changing the reset timing of the accumulated charge.

An AFE (Analog Front End) 106 carries out gain adjustment, sampling, A/D conversion or the like, for the analog image data output from the image capturing element 105, and outputs the image data to a video signal processing unit 121 as a digital image data. Note that, when controlling the exposure value of the image data to be acquired (hereinafter referred to as simply exposure control), the aperture value, the accumulation time, and the analog gain value are set before the accumulation of charge by the image capturing element 105, and the digital gain value is adjusted by the AFE 106 after the accumulation of charge by the image capturing element 105. The image capturing element 105 and the AFE 106 described above may be configured as an image capturing unit in the exemplary embodiment.

Then, the video signal processing unit 121 according to the exemplary embodiment will be described referring to FIG. 2. FIG. 2 is a block diagram illustrating an exemplary configuration of the video signal processing unit 121 of the camera 100 which is the image capturing apparatus according to the first exemplary embodiment practicing the present disclosure. The video signal processing unit 121 executes various kinds of image processing of the digital image data output from the AFE 106. The configuration inside the video signal processing unit 121 and the operation of each part will be described below.

A photometric calculating unit 201, an exposure control unit 202, a development processing unit 203, a memory interface 204, a compositing unit 205, and a video encode processing unit 206 are provided inside the video signal processing unit 121.

The photometric calculating unit 201 carries out photometry of the brightness of the object based on the digital image data output from the AFE 106 and obtains the brightness of the object (object luminance).

The exposure control unit 202 calculates the exposure value corresponding to the object luminance acquired by the photometric calculating unit 201, and gives command to each part of the camera 100 to operate so as the exposure value of the image data acquired by capturing the image of the object to be the calculated exposure value. Note that, the exposure value corresponding to the object luminance is calculated based on the program diagram in FIG. 4 which will be described below. Further, based on the calculated exposure value, the exposure control unit 202 gives command, via the memory interface 204 and a bus 150, to each part of the camera 100 to operate, and thereby the exposure control is carried out by each part of the camera 100 operating according to the command.

Further, the exposure control unit 202 is also an exposure difference setting unit which sets the exposure value difference (exposure difference) between images acquired for compositing in the HDR video mode which will be described below. Further, the exposure control unit 202 is a setting unit setting a blind zone which is the predetermined range where the exposure value is not controlled (exposure value is not changed) to follow the change in the object luminance for capturing the image of the object. That is, the exemplary embodiment can set the width of the blind zone by the exposure control unit 202. The detail will be described below referring to FIG. 3.

The development processing unit 203 executes white balance, color interpolation, color correction, γ conversion, edge emphasizing, resolution conversion, or the like of the digital image data converted by the AFE 106. The processing result in the development processing unit 203 is output to a memory 132 connected to the outside of the video signal processing unit 121 via the memory interface 204 and the bus 150.

Note that, in the HDR composite processing in the exemplary embodiment which will be described below, the image of the object is captured a plurality of times with different exposure values, and the plurality of pieces of image data having different exposure values corresponding to the image capturing is output to (acquired by) the image capturing element 105. The development processing unit 203 applies each type of processing as described above to each of the plurality of pieces of image data having different exposure values output from the image capturing element 105. Then, the image data which is completed with the process is stored in the memory 132. Note that, the CPU 131 which is a control unit described below controls the image capturing element 105 to output the plurality of pieces of image data having different exposure values. The method of acquiring the plurality of pieces of image data having different exposure values will be described below.

The memory interface 204 is connected to the memory 132 via the bus 150, and works as an interface for carrying out acquisition and output of the data stored in the memory 132 which is used inside the video signal processing unit 121.

The compositing unit 205 reads out, from the memory 132, a plurality of pieces of image data having different exposure values output from the development processing unit 203, and composites the plurality of images having different exposure values. The composited image data (hereinafter referred to as simply a composite image) is output from the compositing unit 205 to the memory 132 as composite data.

The video encode processing unit 206 reads out the composite image from the memory 132 and carries out encode processing. By applying encode processing to the composite image in the video encode processing unit 206, the motion image data can be produced. The produced motion image data is stored in the memory 132. The configuration of the video signal processing unit 121 of the exemplary embodiment is as described above.

The memory 132 in FIG. 1 is a storing unit in which various kinds of data processed inside the camera 100 such as in the video signal processing unit 121 are stored. For example, the memory 132 stores various kinds of image data acquired by the camera 100 and various processed results of photometric calculation, focus control, exposure control, or the like.

Further, a program executed in the camera 100 and a constant value, an exposure condition, a calculating formula, a program diagram, or the like used in the operation are previously stored in the memory 132. Note that, the program executed in the camera 100 is the program which gives a command for the operation similar to the flow illustrated in FIG. 3.

A timing generation unit 143 outputs a timing of operation to each part of the camera 100. The timing generation unit 143 is controlled by the CPU 131 connected to the timing generation unit 143 via the bus 150, and controls the operation timing for each of the image capturing element 105, the AFE 106, and the video signal processing unit 121.

Further, other than components described above, the lens control unit 141, the shutter control unit 142, a power source 110, the memory 132, a display control unit 151, a card input/output unit 171, and various types of switches are connected to the bus 150.

Note that, the various types of switches as described above are a main switch 161, a first release switch 162, a second release switch 163, a live view start/stop button 164, a video recording start/stop button 165, an up/down/right/left select button 166, and a determination button 167.

The power source 110 supplies power via the bus 150 to each circuit provided inside the camera 100.

The CPU 131 is a control unit which generally controls each part of the camera 100. For example, the CPU 131 carries out readout processing of an image data captured by the image capturing element 105 and operation control inside the video signal processing unit 121, operation timing control of the memory 132, and driving control of the lens control unit 141 and the shutter control unit 142. Note that, the CPU 131 carries out the control described above by reading out and executing a predetermined program stored in the memory 132.

The display control unit 151 carries out control to display the analog image data for display on a display unit 153 such as a TFT composed of a liquid crystal display element or an external display unit which is not shown in the drawing. The display control unit 151 converts the image data for display stored in the memory 132 from digital image data into analog image data for display in a D/A conversion unit 152 according to the command from the CPU 131. Then, the display control unit 151 displays the converted analog image data on the display unit 153 or an external display unit (not shown in the drawing) through a video output terminal 154 or an HDMI output terminal 155 via cables.

Note that, the image data acquired by the image capturing element 105 is temporarily stored in a VRAM of the memory 132 after various kinds of processing are carried out in the AFE and the video signal processing unit 121. The display control unit 151 reads out the digital image data for display from the VRAM of the memory 132 according to the command from the CPU 131. Then, the display control unit 151 executes the processing described above to continue updating the image for display on the display unit 153, thereby enabling displaying of a motion image for recording and displaying of the live view.

A card slot 172 allows to insert therein a detachable storage medium 173, for example, an SD card. Further, the storage medium 173 is electrically connected to the card input/output unit 171 with the storage medium 173 inserted in the card slot 172. Further, in this state, the image data recorded in the memory 132 can be recorded in the storage medium 173. Further, the data recorded in the storage medium 173 can be read out by the camera 100.

Note that, the exemplary embodiment may be configured that the CPU 131 controls the driving of each part in the camera 100 without the control unit and the processing unit as described above. Further, it may be configured that the control unit and the processing unit as described above operate together to carry out control (processing) without the CPU 131, thereby controlling the driving of each part in the camera 100.

Basic Operation of Apparatus

The basic operation of the camera 100 which is an image capturing apparatus according to the exemplary embodiment will be described referring to FIG. 1. First, when a user switches on the main switch 161, the power source 110 supplies power to each part of the camera 100.

When the power is supplied to each part of the camera 100, for example, a command from the CPU 131 is transmitted to the shutter control unit 142 and the shutter 104 opens, and thereby an optical image of the object, introduced by the lens 101, is formed on the image capturing element 105. Further, a graphical user interface (hereinafter referred to as GUI) for setting various parameters is displayed on the display unit 153.

The first release switch 162 is switched on by the first stroke (half depress) of a release button (not shown in the drawing). In the exemplary embodiment, the user first switches on the first release switch 162 of the release button (not shown in the drawing) to start preparation of shooting of the object.

To describe in detail, the lens control unit 141 executes the control such as focusing operation and zooming operation of the lens 101 and driving of the diaphragm 102, as required, according to the command from the CPU 131 via the bus 150.

The second release switch 163 is switched on by the second stroke (full depress) of the release button (not shown in the drawing). Further, under the state in which the second release switch 163 is on, the CPU 131 controls the operation of the shutter control unit 142 based on the start timing of accumulation which is previously determined by the timing generation unit 143. Further, by the shutter control unit 142 controlling the driving (open/close) of the shutter 104, the image of the object is captured for a predetermined accumulation time.

Then, by the user manipulating the up/down/right/left select button 166 and the determination button 167, various parameters displayed on the GUI can be selected and set.

Further, either of the video shooting mode in which the HDR composite processing is not carried out (the second mode) or the video shooting mode in which the HDR composite processing is carried out (the first mode) can be switched to be set. In the description hereinafter, the first mode is referred to as the HDR video mode and the second mode is referred to as the normal video mode.

In the normal video mode, an image captured by the image capturing element 105 which is not used for compositing is continuously output. Further, in the HDR video mode, a plurality of images having different exposure values captured by the image capturing element 105 which is used for compositing is continuously output.

Note that, in the exemplary embodiment, the switching between the normal video mode (the second mode) and the HDR video mode (the first mode) is made by the CPU 131 which is a switching unit by giving a command to change the setting of each part in the camera 100 according to the manipulation of switches described above.

When the user depresses the live view start/stop button 164, the CPU 131 periodically (e.g., 60 times in a second) takes in the image data from the image capturing element 105 and carries out each processing to arrange the image data in the VRAM of the memory 132.

Thereby, the image taken in from the image capturing element 105 can successively be displayed (live viewed) on the display unit 153. Note that, it may be configured that the live view starts at the same time when the main switch 161 is switched on instead of giving command by buttons.

When the user depresses the video recording start/stop button 165 during the live view, the video recording starts or stops. Note that, in the exemplary embodiment, the user manipulates the video recording start/stop button 165 during the live view to start or stop the video recording. However, it is not limited to the configuration. For example, it may be configured that the live view on the display unit 153 and also the video recording start by manipulating the video recording start/stop button 165 when the live view is not operating. The basic operation of the camera 100 of the exemplary embodiment is as described above.

Shooting Processing

Figure 3:
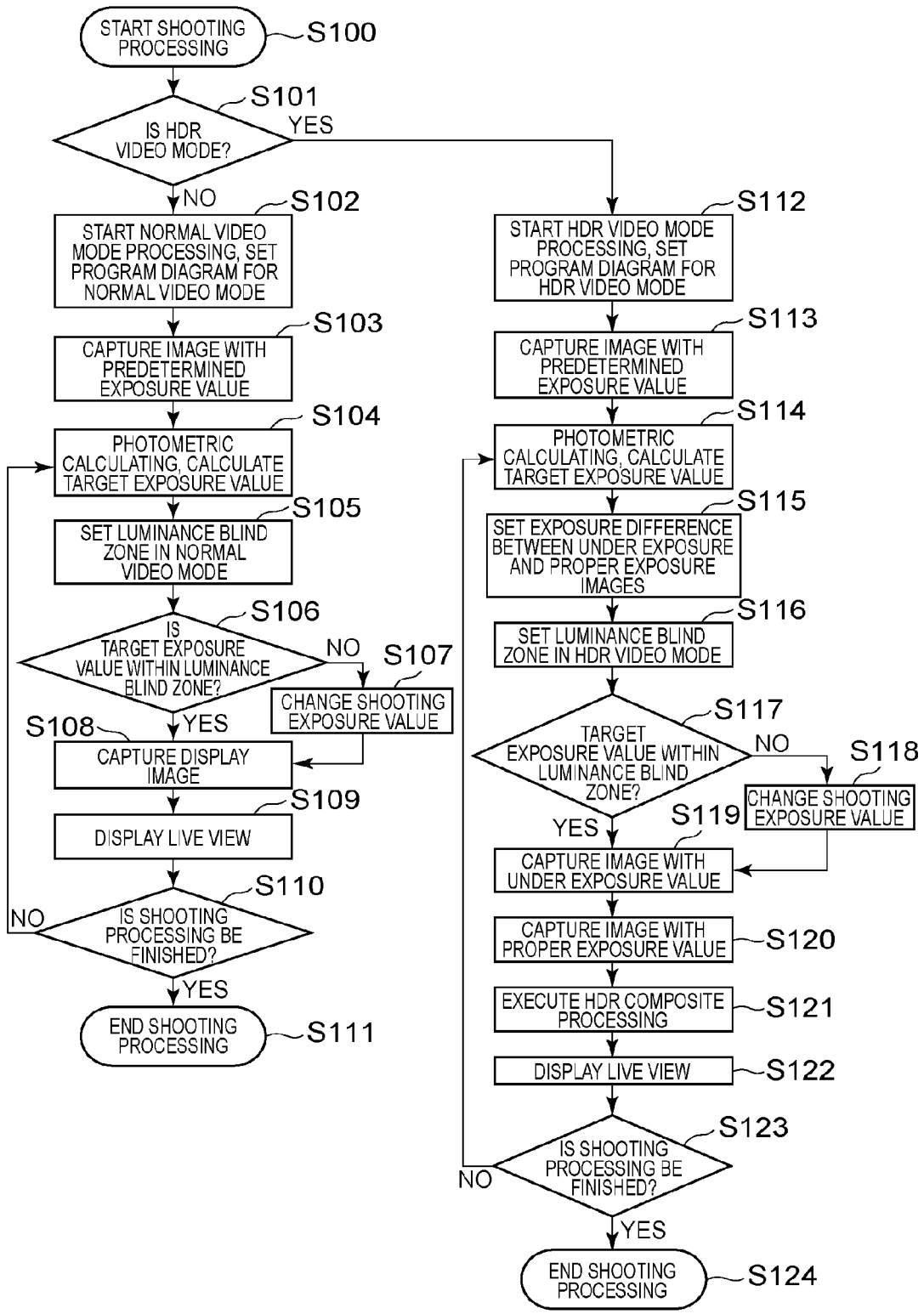
FIG. 3 is a flow chart explaining shooting processing of the digital camera 100 which is the first exemplary embodiment of the image capturing apparatus practicing the present disclosure.

Shooting processing according to the exemplary embodiment will be described below referring to the flow illustrated in FIG. 3. FIG. 3 is a flow chart explaining a shooting processing of the camera 100 which is the first exemplary embodiment of the image capturing apparatus practicing the present disclosure. Note that, the result of each processing in the flow described below is temporarily stored in the memory 132, and suitably output from the memory 132 when necessary.

When the shooting processing starts in the step S100, the CPU 131 determines in the step S101 whether the mode selected by the user is the HDR video mode (the first mode). If the CPU 131 determines that the mode is not the HDR video mode, the CPU 131 determines that the present shooting mode is the normal video mode (the second mode) and proceeds to the step S102. Further, when it is determined that the mode is the HDR video mode, the step proceeds to the step S112.

Shooting Processing in Normal Video Mode

Figure 4A:
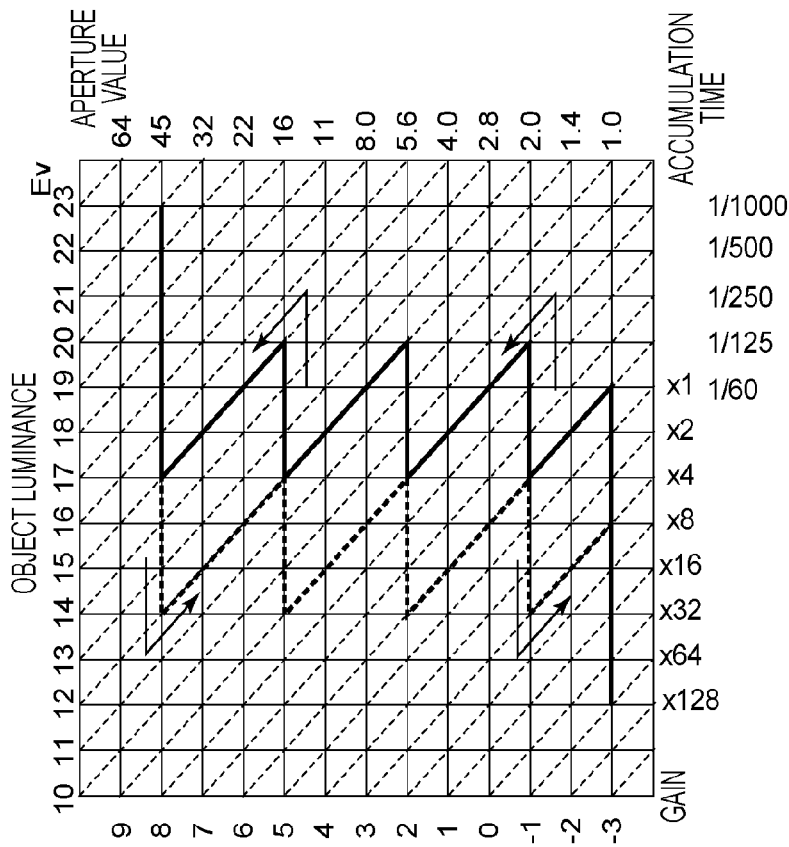
FIGS. 4A and 4B are figures illustrating examples of a program diagram of the digital camera 100 which is the first exemplary embodiment of the image capturing apparatus practicing the present disclosure.
Figure 4B:
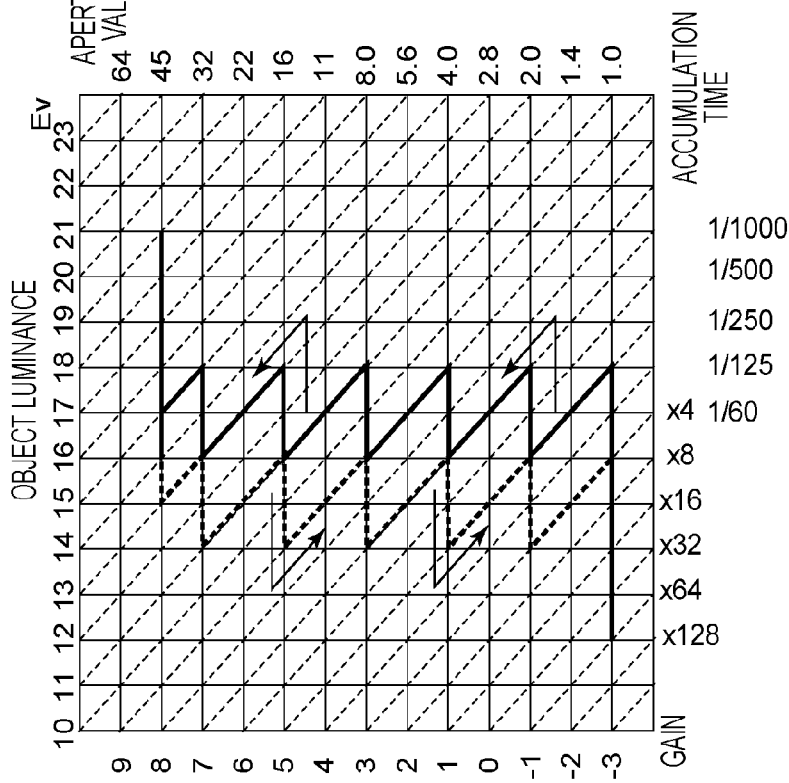

The shooting processing in the normal video mode (the second mode) will be described below. In the step S102, the exposure control unit 202 reads out a program diagram for normal video as illustrated in FIG. 4A from the memory 132 and starts the shooting processing in the normal video mode. Note that, FIGS. 4A and 4B are figures illustrating an example of the program diagram of the camera 100 which is the first exemplary embodiment of the image capturing apparatus practicing the present disclosure. FIG. 4A illustrates the program diagram of the normal video mode and FIG. 4B illustrates the program diagram of the HDR video mode. Note that, FIGS. 4A and 4B illustrate the relation among the diaphragm, the accumulation time, and the gain value (ISO sensitivity) for a luminance Ev of the object. The upper horizontal axis and the left vertical axis represent the object luminance, the bottom horizontal axis represents the accumulation time and the gain value (ISO sensitivity), and the right vertical axis represents the aperture value, respectively.

In the exemplary embodiment as described above, three parameters, that is, the aperture value, the accumulation time, and the gain value (ISO sensitivity) are changed to carry out the exposure control. Detail on the exposure control according to the change in the object luminance and the exposure control to set the exposure value of the image to be composited used for HDR composite processing (hereinafter referred to as exposure difference control) will be described below.

Generally, when acquiring a video, it is desirable to reduce the number of times of driving the diaphragm, provide the accumulation time avoiding high speed shutter, and avoid using high ISO sensitivity to maintain the quality of the video. Particularly, as for the diaphragm, when a lens which does not allow minute driving of the diaphragm (micro-step-diaphragm driving) is attached to the camera, only the operation changing the aperture value by a plurality of steps in a single drive is allowed. In this case, an unpleasant video is acquired by driving the diaphragm following the change in the object luminance.

Regarding such problem, in the exemplary embodiment, the exposure control is carried out along the solid line to increase the exposure value, and the exposure control is carried out along the dashed line to decrease the exposure value based on the program diagram as illustrated in FIGS. 4A and 4B.

Referring back to FIG. 3, the CPU 131 reads out the predetermined exposure value (exposure condition) from the memory 132 in the step S103. Then, the CPU 131 captures a preliminary image based on the exposure value by using the image capturing element 105. Note that, the exposure value of the preliminary image may be any conventional exposure value.

Then, in the step S104, the photometric calculating unit 201 performs photometry on the object based on the previously acquired preliminary image, and based on the photometry result, the photometric calculating unit 201 executes the photometric calculating. Then, the exposure control unit 202 calculates the exposure value for the object luminance calculated by the photometric calculating (hereinafter referred to as a target exposure value) based on the program diagram in FIG. 4A. Note that, it may be configured to calculate the target exposure value by comparing the calculated object luminance and the exposure value previously contained in the memory 132.

The target exposure value is the exposure value for the average value of the object luminance (average brightness) calculated by the photometric calculating and is different from a shooting exposure value which is the exposure value for capturing the image of the object.

Generally, when acquiring a video, the exposure control is carried out so as the shooting exposure value which is the exposure value used for an actual shooting to follow the target exposure value. However, when the shooting exposure value excessively follows the target exposure value, the exposure value is frequently changed. In this case, an unnatural video having frequent changes in brightness is acquired.

Therefore, in the exemplary embodiment, a predetermined range taking the shooting exposure value as reference is set as the range in which the exposure control to follow the change in the object luminance is not carried out (hereinafter referred to as a blind zone). When the object luminance changes and when the exposure value (target exposure value) corresponding to the object luminance (target luminance) exceeds the range (width) of the blind zone, the exposure control is carried out. That is, when there occurs a predetermined difference between the shooting exposure value and the target exposure value, the exposure control is carried out to follow the change in the object luminance. The exposure control to follow the change in the object luminance is carried out based on the program diagram as illustrated in FIGS. 4A and 4B.

Referring back to FIG. 3, in the step S105, the exposure control unit 202 sets the blind zone in the normal video mode as described above. Note that, the blind zone is a blind zone related to the change in the object luminance (hereinafter referred to as a luminance blind zone). The exposure control to follow the change in the object luminance is carried out when the target exposure value which is a parameter related to the change in the object luminance exceeds the range of the luminance blind zone.

That is, in the exemplary embodiment, the exposure control to follow the change in the object luminance is carried out when the target exposure value exceeds the range of the luminance blind zone which is a predetermined range taking the shooting exposure value as reference.

Note that, it may be configured to carry out the exposure control to follow the change in the object luminance when the target luminance exceeds the luminance blind zone which is set by the range taking luminance corresponding to the shooting exposure value as reference. Further, it may be configured to allow changing of the center of the luminance blind zone to be at any location.

Note that, in the exemplary embodiment, the range (width) of the luminance blind zone is determined by the dynamic range of the image capturing element 105, the processing accuracy output from the photometric calculating unit 201, the γ conversion parameter of the development processing unit 203, or the like. However it is not limited to those mentioned above. For example, any width of the luminance blind zone may be determined if the exposure value does not change excessively within the width.

Further, the exemplary embodiment is configured that the shooting exposure value is at the center of the luminance blind zone. However, it is not limited to the configuration. It may be configured that the center of the luminance blind zone is determined to be located at different location from the shooting exposure value. For example, it may be configured that the CPU 131 determines whether the direction of the change in the object luminance is toward high luminance side or low luminance side and that, according to the determined result, the CPU 131 sets the location of the center of the luminance blind zone. Referring back to FIG. 3, in the step S106, the exposure control unit 202 determines whether the previously calculated target exposure value is within the present luminance blind zone. Note that, the present luminance blind zone is the range taking the present shooting exposure value as reference. When it is determined in the step S106 that the target exposure value is within the luminance blind zone, the step proceeds to the step S108.

When it is determined in the step S106 that the target exposure value is not within the luminance blind zone, the CPU 131 gives a drive command in the step S107 to each part of the camera 100, thereby changing the shooting exposure value. The shooting exposure value is changed by changing the aperture value, the accumulation time, and the gain value (ISO sensitivity).

Then, in the step S108, the image capturing element 105 captures the image of the object with the set shooting exposure value and outputs the image data.

Then, in the step S109, the display control unit 151 displays the output image data on the display unit 153 as a display image to update the live view. Note that, when the above process is the first processing after the start of the shooting processing, the live view starts at this timing.

Then, in the step S110, the CPU 131 determines whether to stop the shooting processing. When the shooting processing is to be stopped, the step proceeds to the step S111 and the shooting processing stops. At the same time, the live view on the display unit 153 stops. When the shooting processing is not to be stopped, the step returns to the step S104 and starts the shooting operation of the next image.

As described above, in the normal video mode in the exemplary embodiment, the video is acquired by periodically and continuously outputting the acquired image data by the method described above. The shooting processing in the normal video mode is as described above.

Shooting Processing in HDR Video Mode

The shooting processing in the HDR video mode (the first mode) of the present embodiment will be described below. In the exemplary embodiment, a plurality of images to be composited having different exposure values as described above is acquired, and by compositing the plurality of images to be composited, an image with extended dynamic range is acquired.

As the image to be composited, a proper exposure image (the first image) which is captured with a proper exposure value or an average exposure value for the brightness of the object and an under exposure image (the second image) which is captured with an under exposure value relatively smaller than the proper exposure value are used. Further, by compositing the proper exposure image and the under exposure image, an image having a dynamic range further extended than a case when only the proper exposure image is output (normal state) can be acquired.

Figure 5:
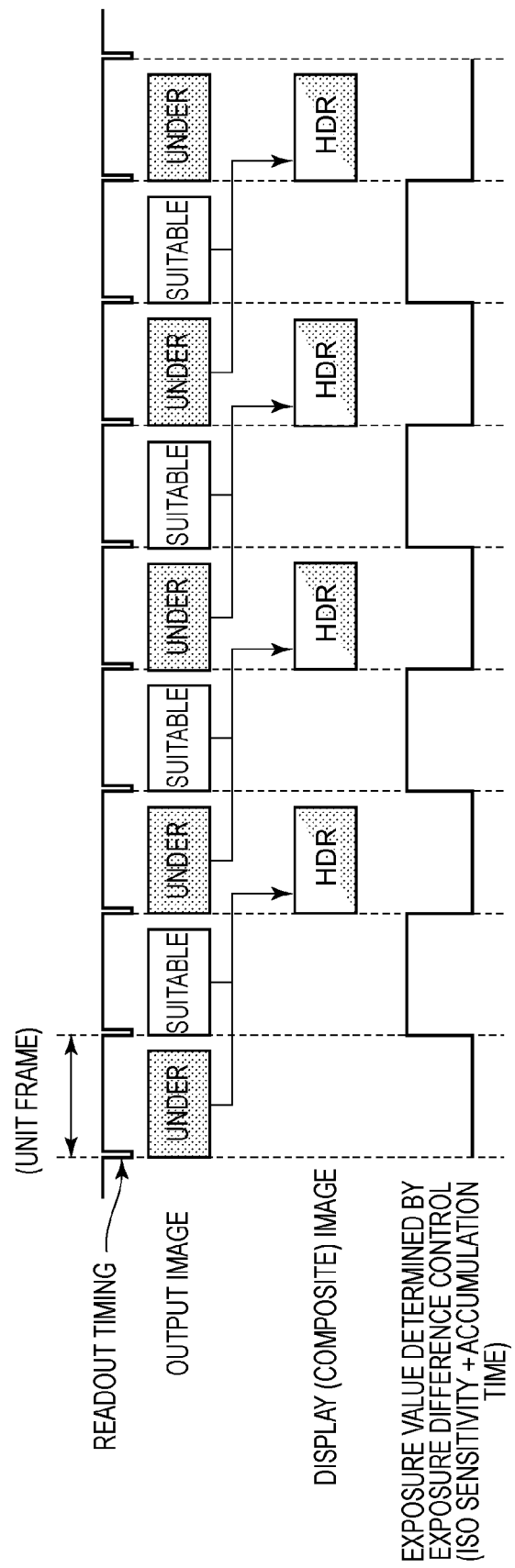
FIG. 5 is a figure exemplarily explaining an image data which is output when the digital camera 100 which is the first exemplary embodiment of the image capturing apparatus practicing the present disclosure is in an HDR video mode.

Note that, the proper exposure image and the under exposure image used for compositing are periodically and continuously output from the image capturing element 105 as illustrated in FIG. 5. FIG. 5 is a figure exemplarily explaining an image data which is output when the camera 100 which is the first exemplary embodiment of the image capturing apparatus practicing the present disclosure is in an HDR video mode.

As illustrated in FIG. 5, in the HDR video mode, the under exposed image and the proper exposure image are alternately output by a unit frame based on a predetermined timing (e.g., timing of readout of image).

In the next frame, the under exposure image and the proper exposure image which are to be composited as a set are output, and the composited image of the two images (hereinafter referred to as a composite image) is displayed as a display image.

The shooting processing in the HDR video mode in the exemplary embodiment will be described below referring to FIG. 3. Note that, the result of each processing described below are temporarily recorded in the memory 132 and suitably read out from the memory 132 when necessary.

When it is determined in the step S101 that the HDR video mode is selected, the CPU 131 starts the shooting processing in the HDR video mode in the step S112. Specifically, the exposure control unit 202 reads out the program diagram for the HDR video mode illustrated in FIG. 4B from the memory 132 responding to the command from the CPU 131 and starts the shooting processing in the HDR video mode.

Then, in the step S113, the CPU 131 captures an image of the object to be used as a preliminary image by using the image capturing element 105. Note that, the description on the method of acquiring the preliminary image will be omitted since the method is similar to that of the normal video mode as described above.

Then, in the step S114, the photometric calculating unit 201 performs the photometric calculation of the object based on the previously acquired preliminary image. The exposure control unit 202 calculates the exposure value (target exposure value) corresponding to the object luminance calculated by the photometric calculation. Note that, the target exposure value in the HDR video mode is the target exposure value for acquiring the proper exposure image.

In the HDR video mode, the under exposure image having an exposure value smaller than the proper exposure image needs to be acquired besides the proper exposure image. That is, in the HDR video mode, it is necessary to carry out the exposure control to produce an exposure difference between images to be composited (hereinafter referred to as exposure difference control).

In the method of the exposure difference control, the exposure value is reduced from the exposure value of the proper exposure image in which the exposure control is carried out by a predetermined exposure difference based on the program diagram illustrated in FIG. 4B to acquire an under exposure image. Note that, in the exposure difference control in the exemplary embodiment, the exposure control unit 202 which is also an exposure value adjusting unit carries out the exposure difference control by changing the accumulation time and the gain value (ISO sensitivity) of the image to be acquired. Further, the exposure difference between images to be composited is set to be two steps, and the under exposure image is acquired so that the exposure value of the under exposure image is smaller than the exposure value of the proper exposure image by two steps.

The number of steps of the exposure value described above corresponds to two steps of Ev value in APEX unit. That is, the exposure value of the under exposure image is determined so as to be smaller than the exposure value of the proper exposure image by 2Ev in APEX unit (hereinafter referred to as simply 2 Ev) according to the program diagram in FIG. 4B. Therefore, in the HDR video mode, in order to set the exposure difference between images to be composited, the region in which the exposure control can be carried out using the accumulation time and ISO sensitivity needs to be secured by 2 Ev in the program diagram in FIG. 4B.

To describe in detail, the region in which the exposure control can be carried out using the accumulation time and the gain value (ISO sensitivity) at a same aperture value in the program diagram for the HDR video mode illustrated in FIG. 4B is set to be smaller than that of the normal video mode (FIG. 4A) by 2 Ev. By this configuration, the exposure difference, of approximately 2 Ev, between the proper exposure image and the under exposure image can be secured.

However, in the program diagram, the range allowing the accumulation time and the gain value (ISO sensitivity) to be set at the same aperture value is reduced by the secured amount of the exposure difference control. That is, regarding the accumulation time and the gain value (ISO sensitivity), the range in which the exposure control to follow the change in the object luminance can be carried out (exposure control range) is reduced when the object luminance changes. Therefore, the frequency of carrying out the exposure control by changing the aperture value may increase by an amount in which the range of the exposure control related to the accumulation time and the gain value (ISO sensitivity) is reduced. That is, in the HDR video mode, a parameter not used for the exposure difference control may increase the frequency of carrying out the exposure control according to the change in the object luminance.

When the frequency of carrying out the exposure control by changing the aperture value increases during the video shooting, the depth of field among unit frames (unit images) of the video frequently changes, which results in unnaturalness in the acquired video.

Further, since the diaphragm 102 is driven to change mechanically, when the diaphragm 102 is driven during the exposure difference control, the exposure difference between images to be composited which is set by the exposure difference control may change. That is, there might be a chance that the exposure difference of 2 Ev secured for the exposure difference control cannot be maintained between images to be composited.

Further, when minute driving of the diaphragm (micro-step-diaphragm driving) cannot be provided, the time required to complete the driving of the diaphragm for the targeted exposure value will be relatively longer than the case in which the accumulation time and the gain value are changed. Therefore, during the driving of the diaphragm, the brightness of the acquired image might unnaturally change. Particularly, since the number of driving the diaphragm 102 is likely to be larger in the HDR video mode than in the normal video mode as described above, the frequency of unnatural change in brightness of the image in the HDR video mode will be larger than in the normal video mode.

As described above, the brightness of the video captured during the driving of the diaphragm 102 is ununiform between unit frames. Therefore resulting in acquisition of a video with unnatural brightness.

Note that, when the exposure difference control is carried out by changing the aperture value, the frequency of carrying out the exposure control using the accumulation time and the gain value according to the change in the object luminance increases. For example, when the frequency of changing the gain value (ISO sensitivity) increases, an amount of noise between unit frames changes. Further, if the frequency of changing the accumulation time increases, the continuity of the image is lost since the accumulation time between unit frames will be different. In either of the cases described above, the acquired video will be unnatural.

In the normal video shooting, different parameter is used for the exposure control according to the quality of video required from the user. For example, if the difference in the depth of field between unit frames is to be avoided as described above, one option is to reduce the frequency of carrying out, by changing the aperture value, the exposure control as much as possible. However, in the HDR video mode, the parameter not used in the exposure difference control increases the frequency of carrying out the exposure control as described above, so that the quality of the acquired video may be different from the intention of the user. To solve the problem, in the HDR video mode, it is required to suppress the increase in the frequency of carrying out the exposure control, caused by the parameter not used in the exposure difference control.

The exemplary embodiment provides the solution to the problem described above by setting the width of the luminance blind zone in the HDR video mode larger (wider) than the range (width) of the luminance blind zone in the normal video mode. This will be described below referring to FIG. 6.

Now, referring back to the flow in FIG. 3. In the step S115, the exposure control unit 202 sets the exposure difference between the proper exposure image and the under exposure image from the result of the photometric calculating. Note that, the exemplary embodiment may be configured to set the exposure difference between images to be composited to be an exposure difference other than 2 Ev. Further, it may be configured to calculate the exposure difference from a calculating formula previously stored in the memory 132.

Then, in the step S116, the exposure control unit 202 sets the luminance blind zone in the HDR video mode.

Figure 6:
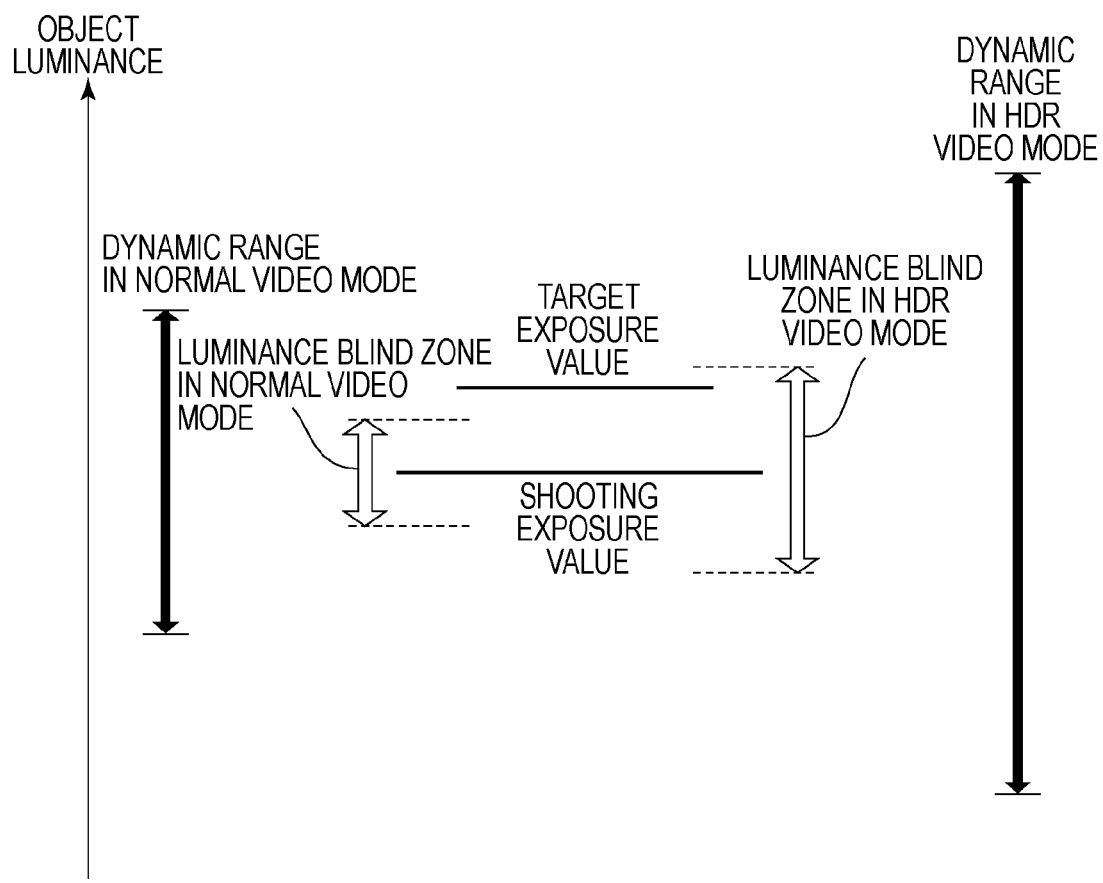
FIG. 6 is a figure exemplarily explaining a width of a dynamic range and a luminance blind zone in a normal video mode and an HDR video mode of the digital camera 100 which is the first exemplary embodiment of the image capturing apparatus practicing the present disclosure.

The luminance blind zone in the HDR video mode will be described below referring to FIG. 6. FIG. 6 is a figure exemplarily explaining the width of the dynamic range and the luminance blind zone in the normal video mode and the HDR video mode of the camera 100 which is the first exemplary embodiment of the image capturing apparatus practicing the present disclosure.

As illustrated in FIG. 6, in the exemplary embodiment, the width of the luminance blind zone in the HDR video mode is set to be wider than the width of the luminance blind zone in the normal video mode. That is, the CPU 131 sets the luminance blind zone in the normal video mode so as the range of the luminance blind zone (the second range) in the normal video mode to be narrower than that of the luminance blind zone (the first range) in the HDR video mode. This configuration allows the frequency of the target exposure value being contained (included) in the luminance blind zone in the HDR video mode greater than in the normal video mode.

Therefore, the increase in the frequency of carrying out the exposure control by changing the aperture value can be suppressed. That is, in the HDR video mode, the camera 100 of the exemplary embodiment can suppress the increase in the frequency, caused by the parameter not used for the exposure difference control, of carrying out the exposure control to follow the change in the object luminance.

Note that, in the HDR video mode, since the width of the luminance blind zone is wider than the normal video mode, the followability of the exposure control to the change in the object luminance might be deteriorated. In this case, the exposure value of the proper exposure image deviates from the proper exposure value for the object luminance so that the dynamic range of the proper exposure image may deviate from the suitable position. Therefore, when it is assumed that the degree of the change in the object luminance is similar, the region of which brightness cannot be expressed may increase in the proper exposure image in the HDR video mode compared to the image of the unit frame in the normal video mode.

However, in the HDR video mode, the dynamic range of the composite image is extended by compositing the proper exposure image and the under exposure image. That is, the brightness of the composite image can express the brightness which cannot be expressed in the proper exposure image. Therefore, the brightness of the composite image is suppressed from being unnatural and thereby the video is suppressed from being unnatural after the HDR composite processing.

Note that, the width (range) of the luminance blind zone is desirably set based on the exposure difference between the proper exposure image and the under exposure image. For example, when the exposure difference between the proper exposure image and the under exposure image is large, the frequency of carrying out the exposure control to follow the change in the object luminance may further increase. In this case, the width of the luminance blind zone is extended by the amount of the increase in the exposure difference between images to be composited. By this configuration, the increase in the frequency, caused by the parameter not used for the exposure difference control, of carrying out the exposure control according to the change in the object luminance may further be suppressed.

Further, it may be configured that the location of the center of the luminance blind zone may be changed between the normal video mode and the HDR video mode described above. For example, in the HDR video mode, the center of the luminance blind zone is changed to be at a high luminance side (e.g., upper side in FIG. 6). In this case, the center of the luminance blind zone is changed along the extending direction of the dynamic range so that the composite image is suppressed from having unnatural brightness.

Now, referring back to the flow in FIG. 3. In the step S117, the exposure control unit 202 determines whether the previously calculated target exposure value is located within the range of the luminance blind zone. When it is determined that the target exposure value is located within the range of the luminance blind zone, the step proceeds to the step S119.

When it is determined in the step S117 that the target exposure value is not located within the range of the luminance blind zone, the step proceeds to the step S118. In the step S118, the CPU 131 gives a drive command to each part of the camera 100 to change the shooting exposure value. Note that, in the exemplary embodiment, even when the shooting exposure value is not included within the range of the luminance blind zone, the exposure difference control for setting the exposure difference between images to be composited is carried out.

Then, in the step S119, the CPU 131 captures an under exposure image based on the set shooting exposure value by using the image capturing element 105.

Then, in the step S120, the CPU 131 captures a proper exposure image based on the set shooting exposure value by using the image capturing element 105. Note that, in the exemplary embodiment as described in FIG. 5, the proper exposure image is captured after capturing the under exposure image. This is because the charge from the image capturing element 105 is read out at a periodical timing and the timing of the start of accumulation is set by calculating backward from the timing of the readout.

Since the accumulation time of the under exposure image is shorter than the proper exposure image, when the proper exposure image is captured first, for example, the interval between the proper exposure image and the under exposure image, in which the accumulation of the charge is not carried out, is long. In this case, when the image of an object moving largely is captured, the difference of images between the object of the proper exposure image and the object of the under exposure image will be great, so that the object in the composite image may be blurred.

The exemplary embodiment is configured to capture the image of the object for the proper exposure image after the image of the object is captured for the under exposure image. However, it is not limited to the configuration. For example, it may be configured that the image of the object is captured for the under exposure image after the image of the object is captured for the proper exposure image. That is, it may be configured to output the under exposure image after outputting the proper exposure image. Particularly, when the motion of the object is not large, it is not necessary to limit the order of outputting the image.

Then, in the step S121, the compositing unit 205 performs the HDR composite processing (dynamic range extension processing) by compositing the under exposure image and the proper exposure image. The HDR composite processing will be described in detail. Note that, each processing described below is executed by the compositing unit 205 according to the command from the CPU 131.

First, each of the image to be composited is divided in a plurality of blocks. Then, for the predetermined pixel in the divided block, the proper exposure image and the under exposure image are compared to register images to be composited.

Then, the luminance value is integrated for each predetermined pixel in the image to be composited to calculate an average luminance value. Further, it is determined whether the calculated average luminance value exceeds a predetermined threshold value, thereby detecting in the image the luminance region with black crushing and the luminance region with whiteout, respectively. The detected luminance region with black crushing and the luminance region with whiteout are excluded from the pixel to be composited (exclusion processing). These operation are carried out for both the proper exposure image and the under exposure image.

Then, the luminance level of the under exposure image is adjusted with reference to the luminance level of the proper exposure image. Finally, the proper exposure image and the under exposure image are composited with the predetermined composite ratio, and the composite image is output. Note that, the composite processing of the exemplary embodiment is not limited to the processing described above. For example, it may be configured to execute averaging of images to be composited.

Then, in the step S122, the display control unit 151 displays the image data of the output composite image on the display unit 153 to update the live view. Note that, if the processing is the first processing after the start of the shooting processing, the live view on the display unit 153 starts.

Then, in the step S123, the CPU 131 determines whether to stop the shooting processing. If the CPU 131 determines to stop the shooting processing in the step S123, the step proceeds to the step S124 to stop the shooting processing. At the same time, the live view (displaying) on the display unit 153 also stops. If the CPU 131 determines not to stop the shooting processing in the step S123, the step returns to the step S114 to start the shooting operation of the next image. The above described procedure is the flow showing the shooting processing in the HDR video mode.

As described above, in the exemplary embodiment, the width (range) of the luminance blind zone in the HDR video mode is set to be wider than the width (range) of the luminance blind zone in the normal video mode. By this configuration, the increase in the frequency, caused by the parameter not used for the exposure difference control, of carrying out the exposure control according to the change in the object luminance in the HDR video mode can be suppressed. That is, when a plurality of images having different exposure values is acquired, the increase in the frequency of carrying out the exposure control according to the change about the object luminance can be suppressed.

Note that, the exemplary embodiment is configured to carry out the HDR composite processing using the proper exposure image and the under exposure image. However, it is not limited to the configuration. For example, it may be configured to acquire an image with an over exposure value (over exposure value image) having relatively higher (larger) exposure value than the proper exposure image, and to carry out the HDR composite processing by adding the over exposure value image to the proper exposure image and the under exposure image. In this case, the dynamic range can further be extended than the case in which the HDR composite processing is carried out only using the proper exposure image and the under exposure image.

Note that, the exemplary embodiment is configured that the exposure control unit 202, which is the exposure difference setting unit of the exemplary embodiment, automatically sets the exposure difference between images to be composited according to the photometric result (object luminance) derived in the photometric calculating unit 201. However, it is not limited to the configuration. For example, it may be configured that the exposure difference between images to be composited is set by the user operating the above mentioned switches manually.

Further, it may be configured to determine the combination of images to be composited used for the HDR composite processing according to the object luminance. For example, when the HDR composite processing is performed using the proper exposure image and the under exposure image, the expressiveness of the brightness of the composite image against the object luminance (hereinafter referred to as simply expressiveness) is lower in the bright portion than in the dark portion of the object.

Further, when the HDR composite processing is performed using the proper exposure image and the over exposure image, the expressiveness of the brightness of the composite image against the object luminance (hereinafter referred to as simply expressiveness) is lower in the dark portion than in the bright portion of the object. That is, the expressiveness of the brightness of the composite image changes according to the combination of images to be composited.

So that, when the object luminance is dark on the whole, the proper exposure image and the over exposed image are composited, and when the object luminance is bright on the whole, the proper exposure image and the under exposed image are composited.

Further, in the case described above, it may be configured that, according to the combination of images to be composited, the location of the center of the luminance blind zone is changed to the higher luminance side or the lower luminance side than the shooting exposure value. For example, high luminance side expressiveness of the composite image using the proper exposure image and the under exposure image is higher than the display image in the normal video mode. However, low luminance side expressiveness of the composite image using the proper exposure image and the under exposure image does not change for the display image in the normal video mode.

In this case, the luminance blind zone is set so that the center of the luminance blind zone is located in the side (region) in which the exposure value is larger than the shooting exposure value. That is, the luminance blind zone is set so as to be in the higher luminance side (region) than the shooting luminance corresponding to the shooting exposure value. In this configuration, when the object luminance has changed to the low luminance side (region) in the HDR video mode, the width of the luminance blind zone in the low luminance side is the same as that of the normal video mode. Therefore, the deterioration in the followability of the exposure control to the change in the object luminance can be suppressed.

Note that, when the combination of images to be composited is a combination of the proper exposure image and the over exposure image, the luminance blind zone is set so as that the center of the luminance blind zone is located in the side in which the exposure value is smaller than the shooting exposure value. That is, the luminance blind zone is set so that the center of the luminance blind zone is located in the lower luminance side than the shooting luminance corresponding to the shooting exposure value. By the configuration described above, the deterioration in the followability of the exposure control to the change in the object luminance can be suppressed.

As described above, the exemplary embodiment allows the center of the luminance blind zone to move to the region of high expressiveness according to the combination of images to be composited. By this configuration, the exposure control to follow the change in the object luminance can be carried out in the region in which the expressiveness does not change in the HDR composite processing, and the increase in the frequency of carrying out the exposure control can be suppressed in the region in which the expressiveness is high.

That is, since the exposure control can be carried out according to the range of the dynamic range which is extended by the HDR composite processing, the composite image can further efficiently be prevented from having unnatural brightness.

Second Exemplary Embodiment

Figure 8:
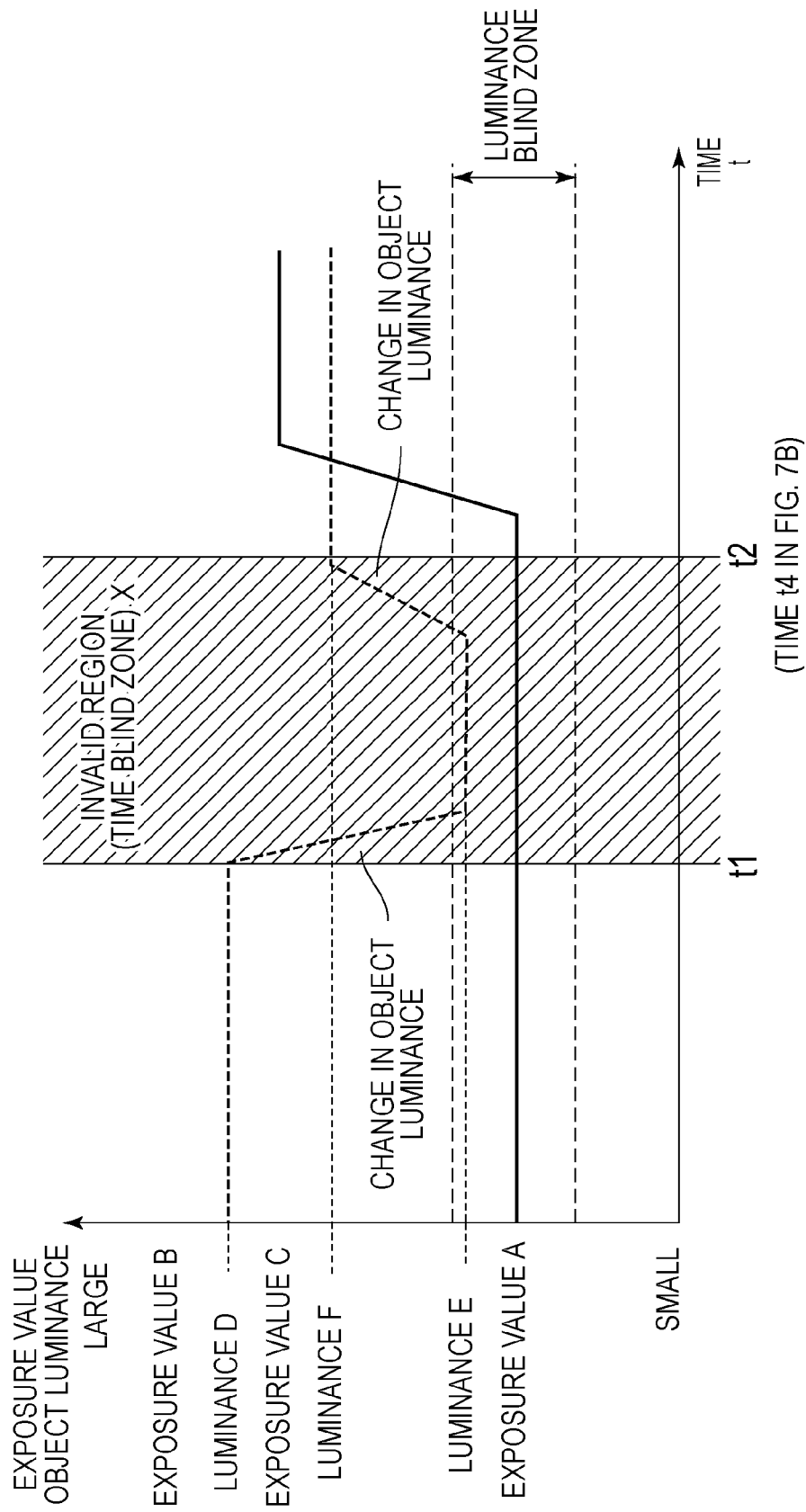
FIG. 8 is a figure exemplarily explaining the change in an object luminance and an exposure value at a predetermined time in the HDR video mode of the digital camera 100 which is the second exemplary embodiment of the image capturing apparatus practicing the present disclosure.
Figure 9:
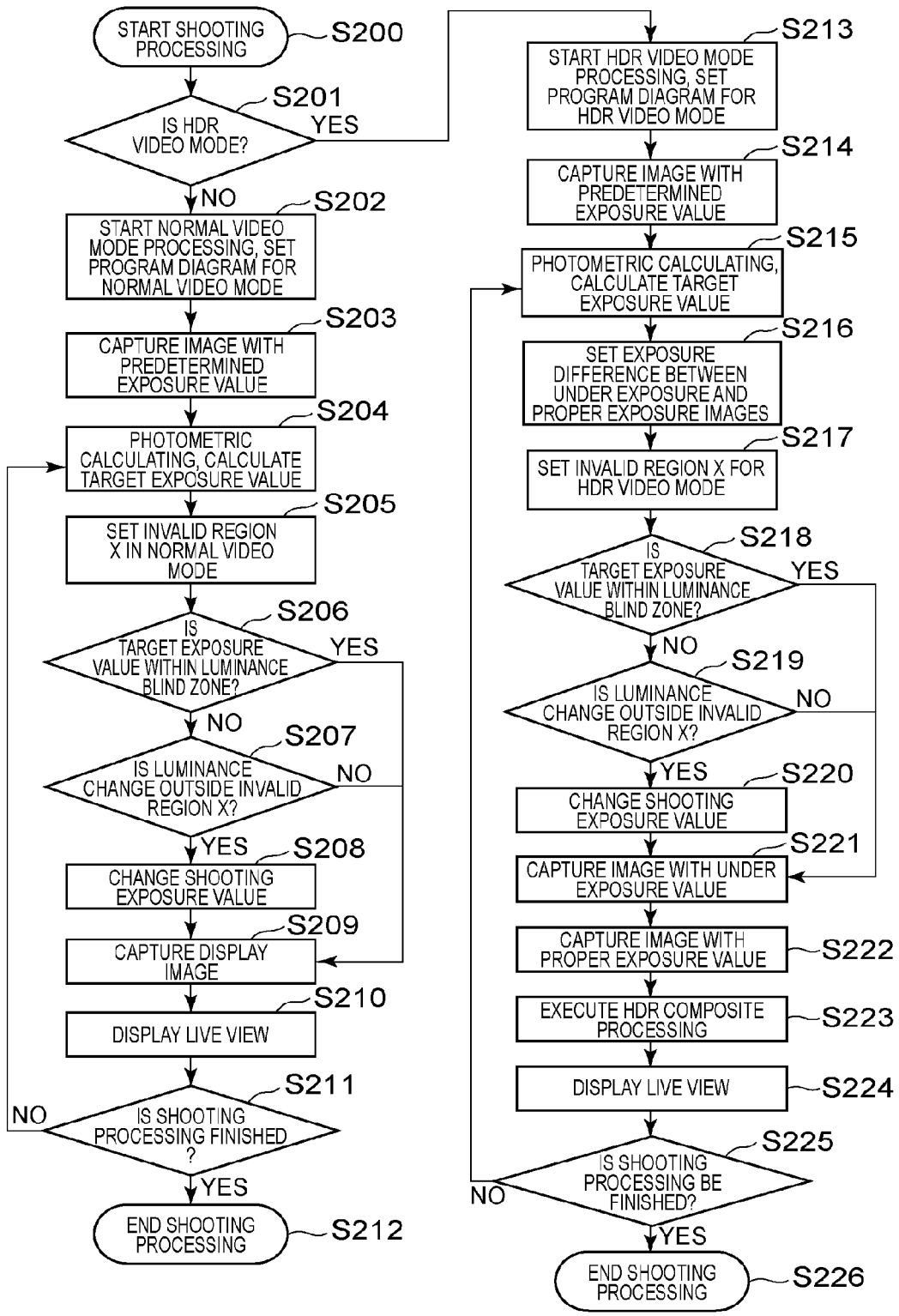
FIG. 9 is a flowchart explaining shooting processing of the digital camera 100 which is the second exemplary embodiment of the image capturing apparatus practicing the present disclosure.

As for the exemplary embodiment, the case in which a predetermined time period from the change in the object luminance is determined as a blind zone (time blind zone) in order to suppress the increase in the frequency, caused by the parameter not used for the exposure difference control, of carrying out the exposure control is described referring to FIGS. 7 to 9. Note that, for a digital camera (hereinafter referred to as simply a camera) 100 which is the image capturing apparatus according to the exemplary embodiment, description is omitted for the configuration similar to the first exemplary embodiment as described above.

FIGS. 7A and 7B are figures exemplarily explaining the change in the object luminance and an exposure value at a predetermined time t in the camera 100 which is the second exemplary embodiment of the image capturing apparatus practicing the present disclosure. The vertical axis represents the object luminance and the exposure value and the horizontal axis represents the predetermined time t. FIG. 7A is an example of the case in which the change in the object luminance is temporary and FIG. 7B is an example of the case in which the change in the object luminance is not temporary.

As illustrated in FIG. 7A, when acquiring a video, it is known to set an invalid region (time blind zone) X which is a range (time between t1 and t2) in which the exposure control is not carried out, before starting the exposure control according to the change in the object luminance. That is, the invalid region (time blind zone) X is set as the time range in which the exposure value is not changed following the change in the object luminance. In this case, the parameter related to the change in the object luminance is the elapsed time after the change of the object luminance. When the elapsed time exceeds the invalid region X, the shooting exposure value for capturing the image of the object is changed following the change in the object luminance.

This is for suppressing the increase in the frequency of carrying out the exposure control as much as possible in such case when the object luminance temporarily changes. For example, when the object passes before the camera 100 and the object luminance temporarily changes from luminance D to luminance E as illustrated in FIG. 7A, the exposure control is carried out to adjust the exposure value to the changed luminance E, and immediately after that, the exposure control has to be carried out again. Note that, beside the case described above, the case in which the object luminance temporarily changes may be a case when a flash is lit. The case in which the change in the object luminance is not a temporary change will be described referring to FIG. 7B. First, the image of the object is captured with an exposure value A which is an exposure for an initial object luminance D calculated by the photometric processing.

Then, the object luminance changes from luminance D to luminance E at time t1. Since the exposure control according to the change in the object luminance is not carried out within the invalid region X1, therefor the shooting exposure value is not changed. Note that, simultaneously, it is determined whether the target exposure value is included within the range of the luminance blind zone as described in the first exemplary embodiment.

Then, if the object luminance is still at luminance E after the elapsed time exceeding the range of the invalid region X1 (after time t2), the shooting exposure value is changed to exposure value B corresponding to object luminance E.

Then, at time t3, just after the shooting exposure value is changed, the object luminance changes from luminance E to luminance F. In this case, similarly to the invalid region X1 described above, the shooting exposure value is not changed within the invalid region X2.

Then, if the object luminance is still at luminance F after the elapsed time exceeding the invalid region X2 (after time t4), the shooting exposure value is changed to exposure value C corresponding to object luminance E. As described above, even when the invalid region is set, the exposure control has to be carried out to follow the change in the object luminance when the object luminance frequently changes within a short period of time.

When such state described above happens in the HDR video mode, similarly to the first exemplary embodiment as described above, the frequency of carrying out the exposure control to follow the change in the object luminance increases by the parameter not used for the exposure difference control.

Therefore, in the exemplary embodiment, as illustrated in FIG. 8, the invalid region X in the HDR video mode is set so that the range of the invalid region X is wider than the invalid region X in the normal video mode. That is, in the camera 100 of the exemplary embodiment, the width of the invalid region X which is the time blind zone is set to be wider (greater in width) in the HDR video mode than the invalid region X in the normal video mode.

FIG. 8 is a figure exemplarily explaining the change in the object luminance and the exposure value at the predetermined time t in the HDR video mode of the camera 100 which is the second exemplary embodiment of the image capturing apparatus practicing the present disclosure. As illustrated in FIG. 8, the width (time) of the invalid region X in the HDR video mode is set to be wider (longer) than the width (time) of the invalid region X in the normal video mode illustrated in FIGS. 7A and 7B. By this configuration, the frequency of carrying out the exposure control can be suppressed even when the object luminance frequently changes within a short period of time. Therefore, the increase in the frequency, caused by the parameter not used for the exposure difference control, of carrying out the exposure control according to the change in the object luminance in the HDR video mode can be suppressed.

The shooting processing of the exemplary embodiment will be described below referring to FIG. 9. FIG. 9 is a flowchart explaining the shooting processing of the camera 100 which is the second exemplary embodiment of the image capturing apparatus practicing the present disclosure. Note that, the result of each processing in the shooting processing of the exemplary embodiment is temporarily recorded in the memory 132 and suitably read out from the memory 132 when necessary.

First, the shooting processing in the normal video mode will be described. Note that, since steps S200 to S204 are similar to steps S100 to S104 in the first exemplary embodiment described above, the description is omitted.

In the step S205, the exposure control unit 202 reads out the information related to the invalid region X in the normal video mode from the memory 132. Then, the exposure control unit 202 sets the invalid region X based on the information related to the readout invalid region X. Note that, the exemplary embodiment is configured that the information related to the time blind zone in the normal video mode and the HDR video mode is previously contained in the memory 132. However, it may be configured that the detail on the time blind zone is set by the selecting operation of the user.

Then in the step S206, the exposure control unit 202 determines whether the previously calculated target exposure value is located within the range of the luminance blind zone. When it is determined in the step S206 that the target exposure value is not within the luminance blind zone, the step proceeds to the step S207. When it is determined that the target exposure value is within the luminance blind zone, the step proceeds to the step S209. Note that, the exemplary embodiment is configured that the width (range) of the luminance blind zone is not changed between the normal video mode and the HDR video mode. However, it may be configured, naturally, to change the width of the luminance blind zone. In this case, the increase in the frequency, caused by the parameter not used for the exposure difference control, of carrying out the exposure control can further efficiently be suppressed.

In the step S207, the photometric calculating unit 201 determines whether the change in the object luminance occurs outside the range of the invalid region X. Specifically, as illustrated in FIG. 7B, it is determined whether a predetermined time has passed after the change in the object luminance. Note that, the predetermined time in the normal video mode is, for example, the time period between time t1 and t2 or the time period between t3 and t4. The predetermined time period is the invalid region X. The invalid region X in the normal video mode is narrower than the invalid region X in the HDR video mode. That is, the range (time) of the time blind zone in the normal video mode (the second mode) is set to have the narrower region (shorter time) than the range (time) of the time blind zone in the HDR video mode (the first mode).

Detection of time t1 and t3 is carried out by the photometric calculating unit 201 transmitting the timing of detection of the change in the object luminance to the exposure control unit 202. Note that, any conventional range (time) of the invalid region X can be provided.

When it is determined that the change in the object luminance does not occur outside the range of the invalid region X in the step S207, the shooting exposure value is kept unchanged and the step proceeds to the step S209. When it is determined that the change in the object luminance occurs outside the range of the invalid region X, the step proceeds to the step S208 and the exposure control unit 202 gives a drive command to each part of the camera 100 to change the shooting exposure value according to the previously obtained target exposure value. The following processing from the step S209 to S212 is similar to the processing from the steps S108 to S111 in the first exemplary embodiment described above, so that the description is omitted.

The shooting processing in the HDR video mode will be described below. Note that, the processing from the steps S213 to S216 is similar to the processing from the steps S112 to S115 in the first exemplary embodiment described above, so that the description is omitted. In the step S217, the exposure control unit 202 reads out the information related to the invalid region X in the HDR video mode from the memory 132. Then, the exposure control unit 202 sets the invalid region X based on the information related to the readout invalid region X. Note that, in the HDR video mode, the range (period) from time t1 to time t2 illustrated in FIG. 8 is determined as the range of the invalid region X (time blind zone). Further, the range of the invalid region X in the HDR video mode is set to be wider than the invalid region X in the normal video mode as illustrated in FIG. 7B.

Note that, in the exemplary embodiment, any invalid region X may be set in the HDR video mode if the acquired video does not have unnatural change in brightness. For example, the user may freely set the configuration, or the configuration may be set according to the combination of images to be composited. Any configuration is allowed if, at least, the range of the invalid region X in the HDR video mode is set to be wider than the range of the invalid region X in the normal video mode.

Then, in the step S218, the exposure control unit 202 determines whether the previously calculated target exposure value is within the luminance blind zone. The processing in the step S218 is similar to the processing in the step S206 described above, so that the description is omitted.

In the step S218, when it is determined that the target exposure value is not within the luminance blind zone, the photometric calculating unit 201 determines in the step S219 whether the change in the object luminance occurs outside the range of the invalid region X. Specifically, as illustrated in FIG. 8, it is determined whether the predetermined time has passed after the change in the object luminance. Note that, the predetermined time in the HDR video mode is the time period between time t1 and time t2. This predetermined time is the invalid region X, and the range of the invalid region X in the HDR video mode is wider than the invalid region X in the normal video mode. That is, the range (time) of the time blind zone in the HDR video mode (the first mode) is set to have a wider region (longer time) than the range (time) of the time blind zone in the normal video mode (the second mode). Note that, the range of the invalid region X in the HDR video mode is not limited to the time period between time t1 and t2. Any range of the invalid region X in the HDR video mode may be provided if, at least, the range is wider than invalid region X in the normal video mode.

In the step S219, when it is determined that the change in the object luminance does not occur outside the range of the invalid region X, the shooting exposure value is kept unchanged and the step proceeds to the step S221. When it is determined that the change in the object luminance occurs outside the range of the invalid region X, the step proceeds to the step S220 and the exposure control unit 202 gives a drive command to each part of the camera 100 to change the shooting exposure value according to the previously obtained target exposure value.

Note that, the exemplary embodiment is configured that the photometric calculation of the object is performed all the time in the region of the invalid region X. And also, configured to change the shooting exposure value according to the object luminance when the elapsed time exceeds the invalid region X. However, it is not limited to the configuration. For example, it may be configured not to perform the photometric processing within the range of the invalid region X, but to change the shooting exposure value according to the result of the photometric calculating performed after the elapsed time has exceeded the invalid region X.

The processing from the steps S221 to S226 is similar to the processing from the steps S119 to S124 in the first exemplary embodiment described above, so that the description is omitted. Note that, even within the range of the luminance blind zone or the invalid region X (time blind zone), the exposure difference control for setting the exposure difference between images to be composited is carried out.

As described above, the range of the invalid region X in the HDR video mode in the exemplary embodiment is set to be wider than the range of the invalid region X in the normal video mode. By this configuration, the frequency of carrying out the exposure control to follow the change in the object luminance in the HDR video mode can be suppressed. Therefore, the increase in the frequency, caused by the parameter not used for the exposure difference control for determining the exposure difference between images to be composited, of carrying out the exposure control according to the change in the luminance in the HDR video mode can be suppressed.

The preferable exemplary embodiments of the present disclosure is described above, though the present disclosure is not limited to the exemplary embodiments and various modifications and alterations can be made without departing from the spirit and the scope of the disclosure. For example, the exemplary embodiment described above is configured to carry out the exposure difference control by changing the accumulation time and the gain value (ISO sensitivity). However, it may be configured to carry out the exposure difference control by changing the aperture value.

In this case, when the exposure control to follow the change in the object luminance is carried out, the frequency of carrying out the exposure control can be suppressed by changing the accumulation time and the gain value (ISO sensitivity). Therefore, since the trouble such as fluctuation of noise between unit frames of the video or losing continuity of the video can be suppressed, the quality of the video can be improved.

Further, the exemplary embodiment described above is configured to perform the composite processing of images to be composited inside the camera 100. However it is not limited to the configuration. For example, the camera 100 may be configured to acquire an image to be composited to be used for the HDR composite processing, and to carry out the HDR composite processing in an external apparatus of the camera 100 using the images to be composited.

Further, it may be configured that the range of the luminance blind zone and the time blind zone in the HDR video mode explained in the exemplary embodiment described above may be alternatively set according to the lens attached to the camera 100. For example, it may be configured that when the lens attached to the camera 100 does not allow the minute driving of the diaphragm 102 or a so-called micro-step-diaphragm driving, the range of the luminance blind zone and the time blind zone in the HDR video mode is provided to be different from that in the normal video mode.

Note that, the lens described above is configured with the lens 101 and the diaphragm 102 of the exemplary embodiment described above. Further, the information of the type of the lens attached to the camera 100 is transmitted to the CPU 131 when the power of the camera 100, with the lens attached to the camera 100, is switched on. Further, based on the received information of the type of the lens, the CPU 131 reads out the information of the luminance blind zone and the time blind zone from the memory 132.

For example, when the CPU 131 determines that the lens attached to the camera 100 is a lens capable of the micro-step diaphragm driving, the range of the luminance blind zone and the time blind zone is kept unchanged in the normal video mode and the HDR video mode. Further, when it is determined that the lens attached to the camera 100 is a lens not capable of the micro-step diaphragm driving, the range of the luminance blind zone and the time blind zone in the HDR video mode is set to be wider than that in the normal video mode. By this configuration, even when a lens not capable of the minute driving of the diaphragm is used, the increase in the frequency of driving the diaphragm 102 according to the change in the object luminance can be suppressed in the HDR video mode. Therefore, the unnatural change in the brightness, caused by the driving of the diaphragm 102, in the acquired image can be suppressed.

Further, in the present disclosure, the driving of each part of the camera 100 is controlled by the lens control unit 141, the shutter control unit 142, the timing generation unit 143, the video signal processing unit 121, the display control unit 151, or the like. However, it is not limited to the configuration. For example, it may be configured that programs according to the flow in FIG. 3 and FIG. 9 as described above are stored in the memory 132 and the CPU 131 executes the program to control the driving of each part in the camera 100. In this case, the CPU 131 determines the luminance blind zone and the time blind zone (invalid region X) and carries out the exposure difference control in the HDR video mode.

Other Embodiments

Embodiments of the present disclosure can also be realized by a computer of a system or apparatus that reads out and executes computer executable instructions recorded on a storage medium (e.g., a non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2013-145800, filed Jul. 11, 2013, which is hereby incorporated by reference herein in its entirety.

What is claimed is:

1. An image capturing apparatus having a processor executing instructions stored in a memory and an image capturing unit configured to capture an image of an object and to output an image, wherein the instructions comprise:
a switching unit configured to switch modes between a first mode in which the image capturing unit outputs a first image and then outputs a second image having an exposure value different from the first image, and a second mode in which the image capturing unit continuously outputs an image not used for compositing;
an exposure control unit configured to control an exposure value for capturing an image of an object, following change in object luminance, when a parameter related to change in object luminance exceeds a predetermined range; and
a setting unit configured to set the predetermined range,
wherein the first image and the second image are used for compositing,
wherein the predetermined range is a range in which an exposure value is not controlled to follow the change in the object luminance for capturing an image of the object,
wherein the setting unit sets a first range as the predetermined range in the first mode, and
wherein the setting unit sets a second range which is narrower than the first range as the predetermined range in the second mode.

2. image capturing apparatus according to claim 1, wherein the instructions further comprise:
an exposure difference setting unit configured to set exposure value difference between the first image and the second image in the first mode, and
an exposure value adjusting unit configured to adjust an exposure value of the first image and the second image based on an exposure value difference between the first image and the second image set by the exposure difference setting unit,
wherein the exposure value adjusting unit adjusts an exposure value of the first image and the second image also in the predetermined range.

3. The image capturing apparatus according to claim 2, wherein the exposure difference setting unit sets a width of the first range which is the predetermined range in the first mode based on an exposure value difference between the first image and the second image set by the exposure difference setting unit.

4. The image capturing apparatus according to claim 1, wherein the exposure control unit controls an exposure value for capturing an image of an object maintaining the first mode when a parameter related to change in object luminance exceeds the first range in the first mode.

5. The image capturing apparatus according to claim 1, wherein the parameter related to change in object luminance is target luminance for capturing an image of an object, and
wherein the setting unit sets the predetermined range so that a center of the predetermined range is in a location different from shooting luminance corresponding to an exposure value for capturing an image of an object.

6. The image capturing apparatus according to claim 1, wherein the parameter related to change in object luminance is a target exposure value corresponding to target luminance for capturing an image of an object, and
wherein the setting unit sets the predetermined range so that a center of the predetermined range is in a location different from shooting exposure value which is an exposure value for capturing an image of the object.

7. The image capturing apparatus according to claim 1, wherein the parameter related to change in object luminance is an elapsed time after change in object luminance, and
wherein the exposure control unit controls the exposure value, following change in object luminance, for capturing an image of an object when an elapsed time after change in object luminance exceeds a predetermined time which is the predetermined range.

8. The image capturing apparatus according to claim 1, wherein the instructions further comprise:
a composite unit configured to composite the first image and the second image,
wherein the first image and the second image output after the first image are composited as a set.

9. The image capturing apparatus according to claim 5, wherein the first image has a smaller exposure value than the second image, and
wherein the setting unit sets the predetermined range so that a center of the predetermined range is located in a higher luminance side than the shooting luminance.

10. The image capturing apparatus according to claim 6, wherein the first image has a smaller exposure value than the second image, and
wherein the setting unit sets the predetermined range so that a center of the predetermined range is located in a larger exposure value side than the shooting exposure value.

11. The image capturing apparatus according to claim 5, wherein the first image has a larger exposure value than the second image, and
wherein the setting unit sets the predetermined range so that a center of the predetermined range is located in a smaller luminance side than the shooting luminance.

12. The image capturing apparatus according to claim 6, wherein the first image has a larger exposure value than the second image, and
wherein the setting unit sets the predetermined range so that a center of the predetermined range is located in a smaller exposure value side than the shooting exposure value.

13. A control method of an image capturing apparatus including an image capturing unit which captures an image of an object and outputs an image, the method comprising:
switching modes between a first mode in which the image capturing unit outputs a first image and then outputs a second image having an exposure value different from the first image, and a second mode in which the image capturing unit continuously outputs an image not used for compositing;
controlling in which an exposure value for capturing an image of an object, following change in object luminance, is controlled when a parameter related to change in object luminance exceeds a predetermined range; and setting the predetermined range, and setting a first range as the predetermined range in the first mode and a second range which is narrower than the first range as the predetermined range in the second mode, wherein the first image and the second image are used for compositing, and wherein the predetermined range is a range in which an exposure value is not controlled to follow change in object luminance for capturing an image of an object.

14. A non-transitory computer-readable storage medium which stores a program configured to command a computer to execute a control method of an image capturing apparatus including an image capturing unit which captures an image of an object and outputs an image, the method comprising:

switching modes between a first mode in which the image capturing unit outputs a first image and then outputs a second image having an exposure value different from the first image, and a second mode in which the image capturing unit continuously outputs an image not used for compositing;

controlling in which an exposure value for capturing an image of an object, following change in object luminance, is controlled when a parameter related to change in object luminance exceeds a predetermined range; and setting the predetermined range, the predetermined range, and setting a first range as the predetermined range in the first mode and a second range which is narrower than the first range as the predetermined range in the second mode, wherein the first image and the second image are used for compositing, and wherein the predetermined range is a range in which an exposure value is not controlled to follow change in object luminance for capturing an image of an object.

15. An image capturing apparatus having a processor executing instructions stored in a memory, wherein the instructions comprise:

a switching unit configured to switch modes between a first shooting mode in which the image capturing unit outputs a first image and then outputs a second image having an exposure value different from the first image, and a second shooting mode in which is different from the first mode; and an exposure control unit configured to control an exposure value, following change in object luminance, when change in object luminance exceeds a predetermined range, wherein the first image and the second image are used for compositing, wherein the predetermined range is a range in which an exposure value is not controlled to follow the change in the object luminance, and wherein the predetermined range in the first shooting mode is narrower than the predetermined range in the second shooting mode.

16. A control method of an image capturing apparatus including an image capturing unit which captures an image of an object and outputs an image, the method comprising:

capturing an object and outputting an image by the image capturing unit;

switching modes between a first shooting mode in which the image capturing unit outputs a first image and then outputs a second image having an exposure value different from the first image, and a second shooting mode in which is different from the first mode; and controlling an exposure value, following change in object luminance, when change in object luminance exceeds a predetermined range, wherein the first image and the second image are used for compositing, wherein the predetermined range is a range in which an exposure value is not controlled to follow the change in the object luminance, and wherein the predetermined range in the first shooting mode is narrower than the predetermined range in the second shooting mode.

17. A non-transitory computer-readable storage medium which stores a program configured to command a computer to execute a control method of an image capturing apparatus including an image capturing unit which captures an image of an object and outputs an image, the method comprising:

capturing an object and outputting an image by the image capturing unit;

switching modes between a first shooting mode in which the image capturing unit outputs a first image and then outputs a second image having an exposure value different from the first image, and a second shooting mode in which is different from the first mode; and controlling an exposure value, following change in object luminance, when change in object luminance exceeds a predetermined range, wherein the first image and the second image are used for compositing, wherein the predetermined range is a range in which an exposure value is not controlled to follow the change in the object luminance, and wherein the predetermined range in the first shooting mode is narrower than the predetermined range in the second shooting mode.

* * * * *